June 26, 1956  R. L. SHEPPARD ET AL  2,751,812
PORTABLE EYE-TESTING EQUIPMENT
Filed March 11, 1950  4 Sheets-Sheet 1
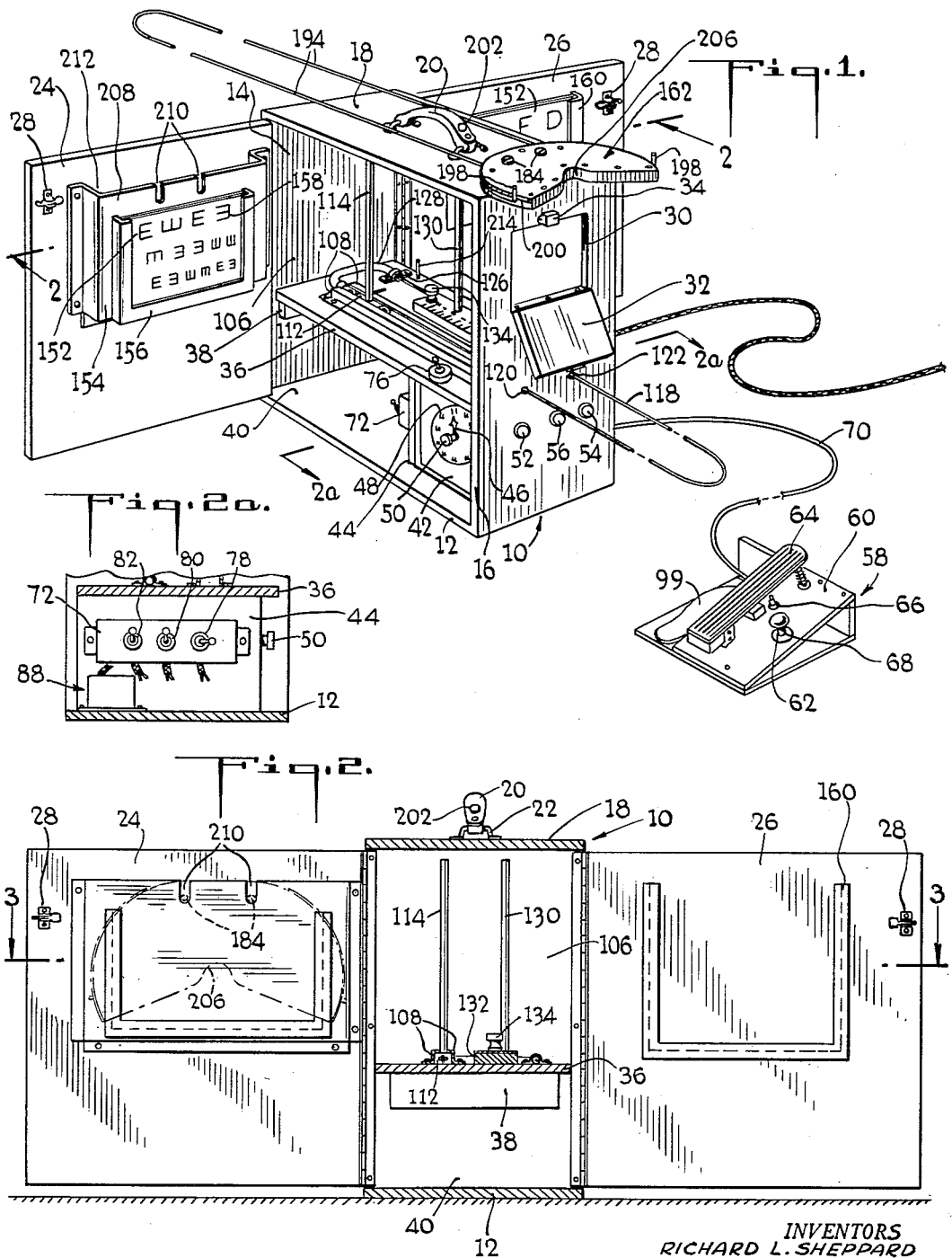
INVENTORS
RICHARD L. SHEPPARD
LENO J. MASTACHE
HERBERT J. SHEPPARD
DONALD S. BUCK
BY Henry L. Burkitt
ATTORNEY June 26, 1956  R. L. SHEPPARD ET AL  2,751,812
PORTABLE EYE-TESTING EQUIPMENT
Filed March 11, 1950  4 Sheets-Sheet 2
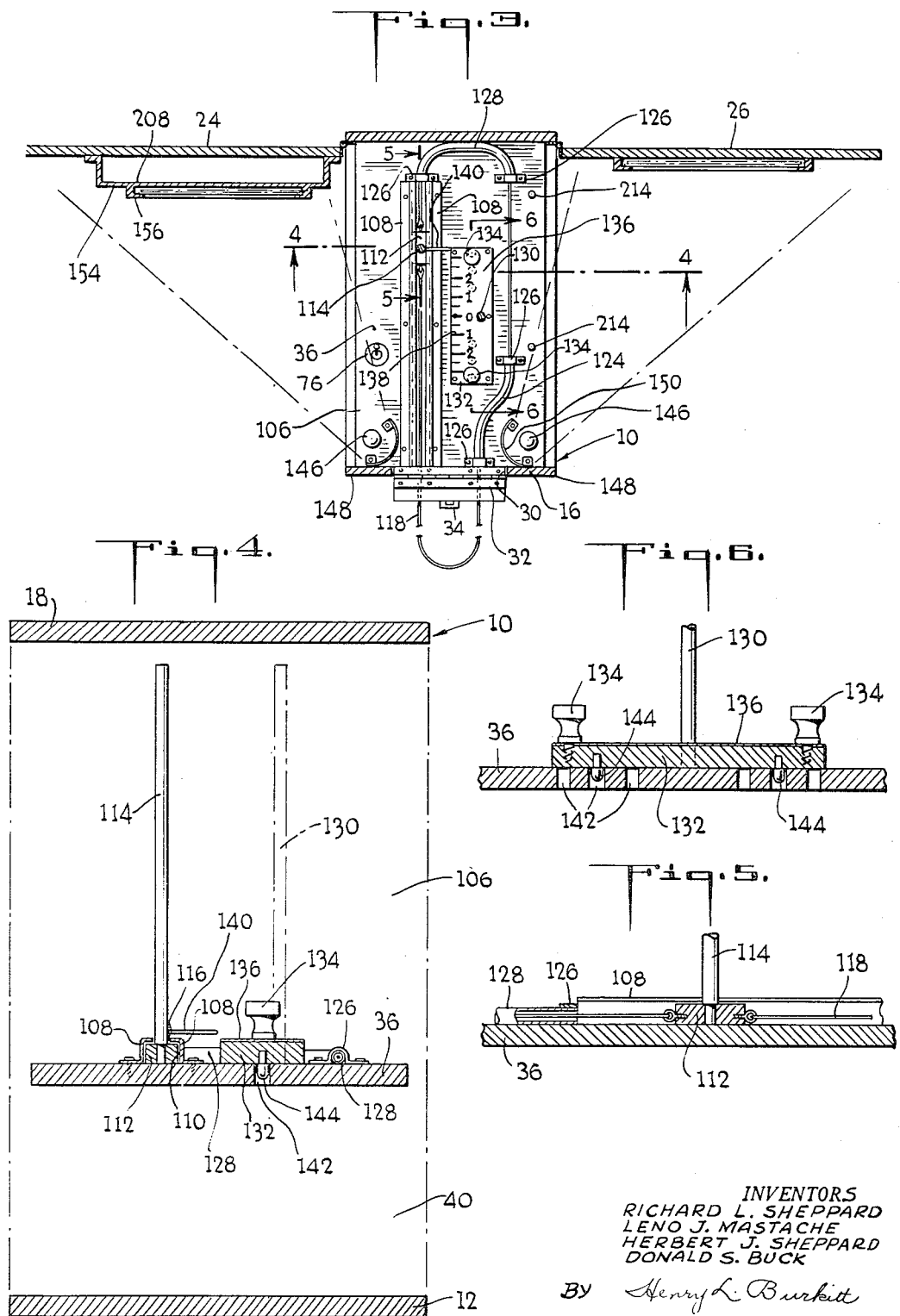
INVENTORS
RICHARD L. SHEPPARD
LENO J. MASTACHE
HERBERT J. SHEPPARD
DONALD S. BUCK
BY Henry L. Burkitt
ATTORNEY June 26, 1956 R. L. SHEPPARD ET AL 2,751,812
PORTABLE EYE-TESTING EQUIPMENT
Filed March 11, 1950 4 Sheets-Sheet 3
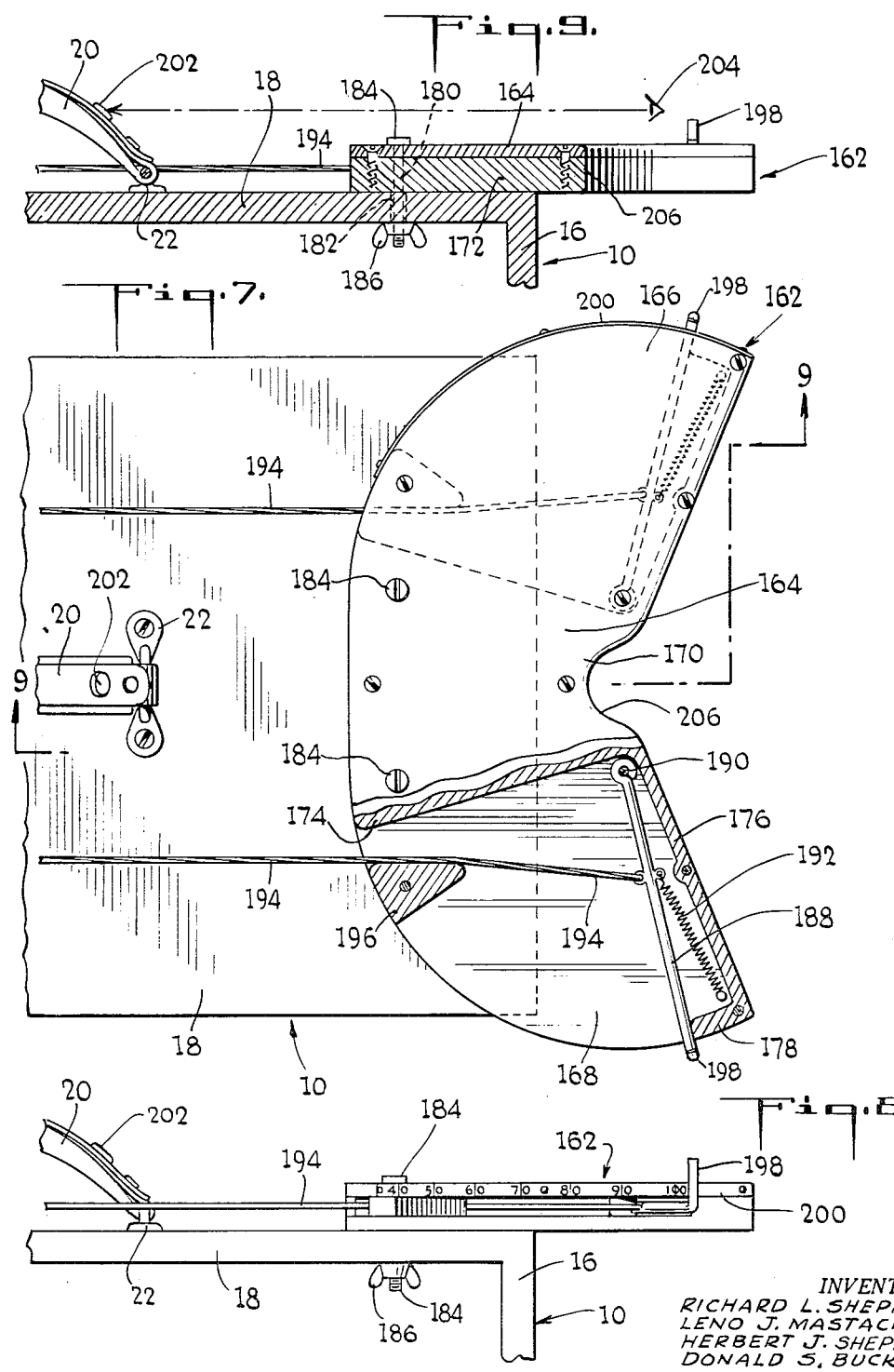
INVENTORS
RICHARD L. SHEPPARD
LENO J. MASTACHE
HERBERT J. SHEPPARD
DONALD S. BUCK
BY Henry L. Burkett
ATTORNEY

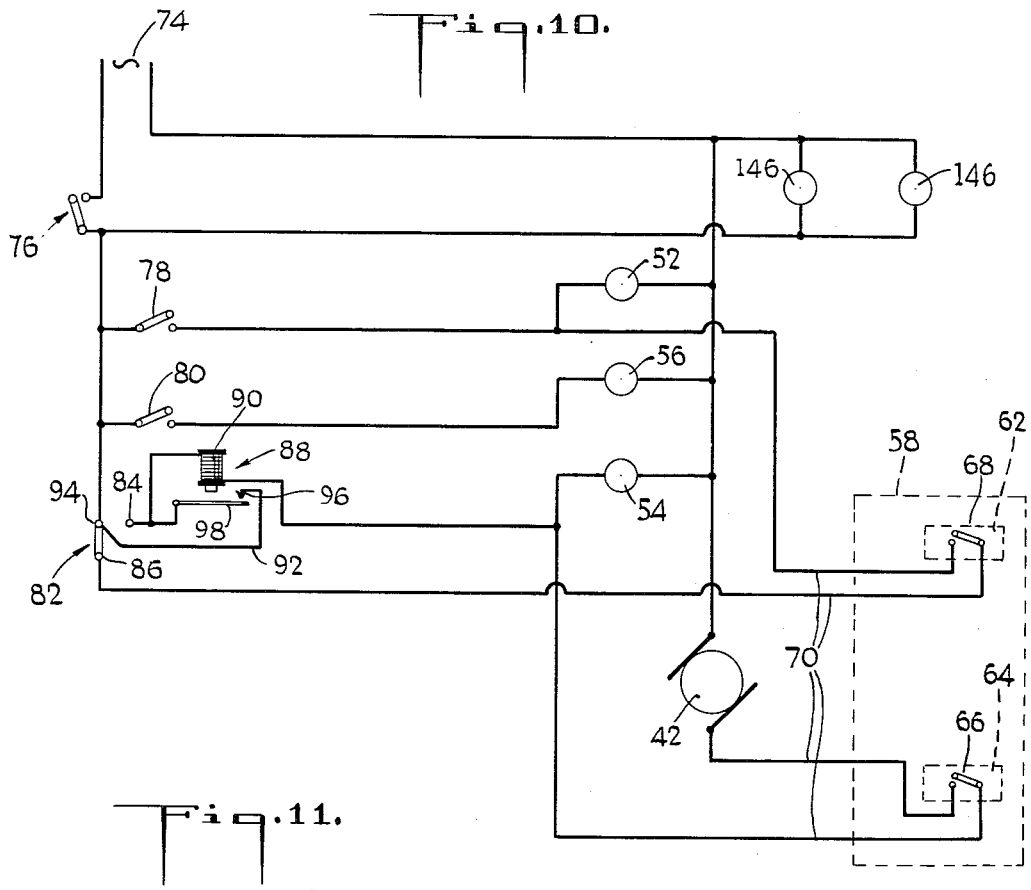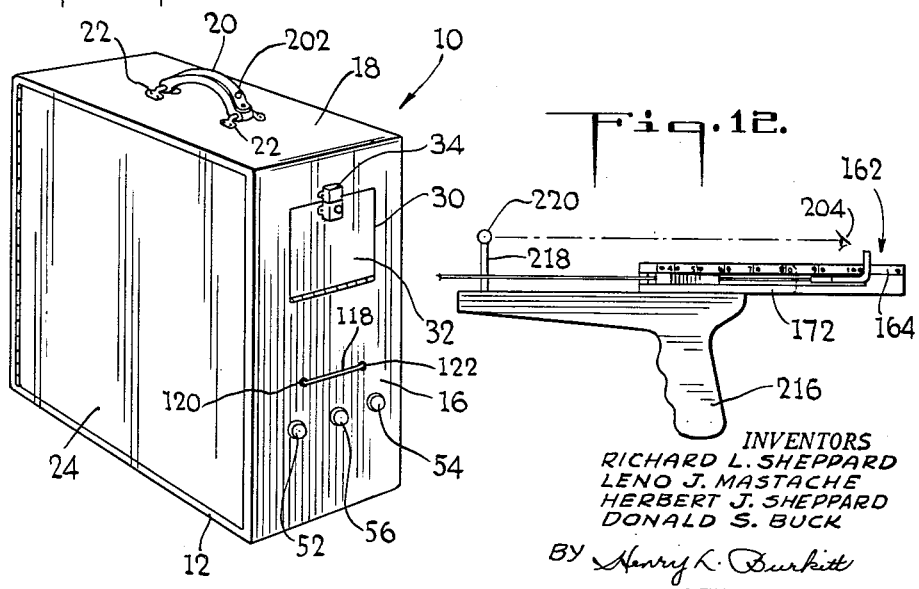

United States Patent Office 2,751,812
Patented June 26, 1956

2,751,812

PORTABLE EYE-TESTING EQUIPMENT

Richard L. Sheppard, Leno J. Mastache, and Herbert J. Shapiro, New York, N. Y., and Donald S. Buck, Arlington, Va.; by judicial decree said Herbert J. Shapiro name changed to Herbert J. Sheppard; said Buck assignor to said Richard L. Sheppard, said Mastache, and said Herbert J. Sheppard Application March 11, 1950, Serial No. 149,098

2 Claims. (Cl. 88—20)

This invention relates to portable testing equipment.

The apparatus to be described may have application in broad fields of testing human response to various stimuli. In one specific aspect, in relation to which the invention will be described, it is concerned with ascertaining the reaction of persons requiring a high degree of reflex action, as, for instance, the drivers of motor vehicles. It is, therefore, to be understood that even though specific reference will be had herein to the use of the apparatus for testing drivers of automotive vehicles, such apparatus may be useful for other types of persons.

It is an object of the invention to provide a compact assembly designed for testing the different reactions of persons, such as drivers of the fast moving vehicles today using the highways, to determine their deficiencies, if any. Such testing is important both in determining whether, for instance, such a person is qualified to be permitted to operate such a vehicle, as well as to warn the individual himself concerning his deficiencies so that, in his future conduct, he may guard against dangerous results that might arise from such deficiencies.

It is an object of the invention to provide apparatus wherein it will be possible to effect testing, without complicated preliminaries, and, in fact, in the field, and thereby to complete the evaluation of the reactions of drivers for such factors as depth of vision, proper vision, timing of reaction to visual stimuli, and the like.

It is an object of the invention to provide such equipment capable of being housed compactly in a very small space, so that all of the elements for such purpose can be transported easily from place to place, and, on location, in the field or elsewhere, be set up with the necessity only of any simple sources of electrical current, such as a battery or the like, to proceed with the test.

It is an object of the invention to provide a cabinet wherein all of the necssary elements for such tests may be housed compactly, and from which such equipment may be withdrawn and assembled in a few moments, in order to proceed with the necessary testing.

It is an object of the invention to provide a compact assembly wherein is housed the elements for effecting a test for the depth of vision of a person to be tested (hereinafter referred to occasionally as the "candidate"), wherein the basic elements of such test are retained housed in the cabinet but are made accessible for viewing during the performance of the test without requiring any substantial breaking down of the assembly.

It is an object of the invention to provide apparatus for a test of the type indicated wherein the relative association of the parts may be changed for successive candidates, but without changing the effect of the test upon such successive candidates.

It is an object of the invention to provide a cabinet of the type indicated wherein, when the cabinet is opened up to provide access to parts housed therein, walls of the cabinet function to provide means for additional tests, as, for instance, color and sight identification tests.

It is an object of the invention to provide means in association with such a cabinet, which may also be separated from the cabinet for its use, wherein, by means of integrated members, the range of vision of the candidate can be ascertained.

It is an object of the invention to provide an assembly of the type indicated, wherein are provided means, usually snugly housed therein, for determining the response of a candidate to external stimulus, as, for instance, a dangerous condition requiring quick application of the brakes.

Other objects of the invention will be set forth hereinafter, or will be apparent from the description and the drawings, in which are illustrated embodiments exemplifying the invention.

The invention, however, is not intended to be restricted to any particular construction, or any particular arrangement of parts, or any particular application of any such construction or arrangement of parts, or any specific method of operation or use, or any of the various details thereof, even where specifically shown and described herein, as the same may be modified in various particulars, or may be applied in many varied relations, without departing from the spirit and scope of the invention, of which the exemplifying embodiments, herein shown and described, are intended to be illustrative only, and for the purpose of complying with the requirements of the statutes for disclosure of an operative embodiment, but not to show all the various forms and modifications in which the invention might be embodied.

On the drawings, in which the same reference characters refer to the same parts throughout, and in which are disclosed such practical constructions, Fig. 1 is a perspective view of a device, embodying features of the invention, shown as it would be disposed in the field, the doors being opened up and the different parts being arranged for carrying out certain of the tests;

Fig. 2 is an elevational view, substantially on the line 2—2 of Fig. 1, illustrating details of the construction shown in Fig. 1;

Fig. 2a is a detail cross-sectional view, showing a part of the cabinet construction as seen from the line 2a—2a of Fig. 1;

Fig. 3 is a detail view, substantially on the horizontal line 3—3 of Fig. 2;

Fig. 4 is a sectional view, taken substantially vertically, and showing the cabinet structure, with the doors removed, as seen from the line 4—4 of Fig. 3;

Fig. 5 is a detail vertical cross-sectional view, substantially on the line 5—5 of Fig. 3, a part of the tube being shown in elevation;

Fig. 6 is a detail view, similar to Fig. 5, substantially on the line 6—6 of Fig. 3;

Fig. 7 is a plan view, substantially to enlarged scale, of a portion of the apparatus as shown assembled for the range-of-vision test, part of the apparatus being broken away to illustrate the internal construction thereof;

Fig. 8 is a detail elevational view of the portion of the apparatus shown in Fig. 7;

Fig. 9 is a vertical cross-sectional view, substantially on the line 9—9 of Fig. 7;

Fig. 10 is a diagrammatic wiring diagram for the apparatus;

Fig. 11 is a perspective view of the apparatus, shown collapsed for transportation; and Fig. 12 is a detail elevational view of a modification of the range-of-vision device.

Cabinet 10, shown in Fig. 11, illustrates the compact manner in which apparatus, embodying features of the invention, may be assembled. In that form, the cabinet is as portable as a small suitcase. Cabinet 10, as shown in Fig. 1, may comprise, substantially rigidly associated, a bottom 12, and walls 14 and 16, and a top 18. On top 18 is disposed a handle 20, which may enter into certain of the functions of the apparatus, as will appear further. Handle 20 may be held in place by means of substantially rigid loops 22 fixedly located on top 18.

Hingedly secured at the two vertical edges of end wall 14 are two side walls or doors 24 and 26. These doors preferably are constructed and assembled so that, when closed in the relation of Fig. 11, they are in snugly fitting relationship to bottom 12, walls 14 and 16, and top 18. Spring catches 28 may be provided to hold the doors tightly in place in that closed condition.

An opening 30 may be provided in end wall 16; a small door 32 is hinged at an edge of that opening; that door may be held closed by means of a spring bolt 34, or other suitable locking means. In order to open doors 24 and 26, door 32 is opened first; then, by reaching through opening 30, doors 24 and 26 are pushed outwardly to open them.

The interior of the cabinet 10 is divided by means of a substantially horizontal partition 36, which may rest on ledges 38 provided on walls 14 and 16 for that purpose. Below partition 36 is a compartment 40, useful, among other purposes, for the reception of certain parts of the apparatus when the apparatus is made compact for transportation. In compartment 40 is located an electric timing means 42 of any suitable type. Such timing means preferably is mounted upon a vertical panel 44 extending between bottom 12 and partition 36. The timing means preferably is of the type driven by a suitable electric motor; on energization by closing a suitable switch, hand 46 will be caused to rotate past suitable indicia 48 in accordance with elapsed time. The indicia may be graduated according to any desired scale; for instance, it may be graduated in seconds, or parts of seconds. Hand 46, by means of a reset button 40, may be set at a zero setting, before the commencement of each test.

On end wall 16 are positioned three distinct electric lighting members 52, 54 and 56, which are in a circuit with devices to be described. Electric lighting member 52 may be a green light; electric lighting member 54 may be a red light; electric lighting member 56 may be an amber light.

Provided for use with the apparatus is a unit 58 which includes a platform 60 disposed at an angle similar to that of the floor of a car; a pair of pedals 62 and 64 may be mounted with the unit, and are pivoted and spring pressed so that they are usually raised above the level of platform 60. The respective pedals engage actuating triggers extending into the body of the unit, below platform 60, to function for actuating, selectively, one of switching members 66 and 68; members 66 and 68 are in a circuit, of which cable 70 forms a part in the manner to be described. The cable, as seen in Fig. 2, extends into compartment 40, to terminals on a block 72 on panel 44. Unit 58, together with cable 70, is then housed in compartment 40, when the cabinet is closed.

In the circuit diagram of Fig. 10, a power source 74 is illustrated in the conventional manner. Such source could be that derived from any available circuit for which the apparatus is designed; that is, either the usual lighting and power circuits, or a battery circuit. A main switch 76 is shown. When a test is under way, the person conducting the test, hereinafter sometimes referred to as the "supervisor," closes switch 76, which may be a button on partition 36. Switch 78 is in circuit with lighting member 52. This lights up that member, showing a green light; the candidate depresses pedal 62, corresponding to the accelerator pedal, and closes the normally open switching member 68. The circuit will then be completed through that switch and lighting member 52, so that a green light will continue to show. The supervisor may also resort to switch 78 to test the subject as to color sensitivity. For the same purpose, switch 80 may be used to close the circuit to lighting member 56, the amber light.

A switch 82, mounted on block 72, is accessible to the supervisor. This switch is shown as a single arm, three pole, switch to close a circuit either through pole 84, and thereby to lighting member 54, or through pole 86, to switch 68. In other words, when switch 82 normally is in position, it is on pole 86, so that the candidate may close the circuit, and keep it closed, for lighting member 52. Now, when the person conducting the test swings the bar of the switch to pole 84, the circuit for lighting member 54 is closed, warning the operator of danger, as the red light shows. The action of switch 82 at this time may be momentary, if desired. It may then return to close the circuit of lighting member 52. However, by closing the circuit of member 54, a number of other results are attained. The circuit of timing means 42 also is closed through the normally closed switch 66, which is associated with pedal 64. Thus, if the candidate should try to "beat the clock" by depressing the "brake" pedal 64 before the signal, he will have broken that circuit, and the timing means 42 will be completely ineffective. Also, by momentarily making and then breaking the circuit at switch 82, the candidate will not be able to pick up at a later time. However, if the candidate does not have his foot on pedal 64, switch 66 will continue closed, timing means 42 will start to measure time, and a holding switch 88 will be energized. This holding switch consists of a solenoid 90 in the circuit leading from pole 84 to both lighting member 54 and switch 66. A lead 92 directly from pole 94 of switch 82 to a contact 96, completes a holding circuit through armature 98 to solenoid 90, when the circuit was originally closed at pole 84.

Now, on moving switch 82 to break the circuit to pole 84, solenoid 90 will continue to hold the circuit until switch 66 is opened by actuation of pedal 64. When this act is effected by the candidate under the stimulus of the red light of member 54, the circuits of timing means 42 and holding switch 88 will be broken, and the measuring of elapsed time completed. Now, a reading of elapsed time may be had from indicia 48 and hand 46.

For the test, the supervisor throws main switch 76, providing the energy for the apparatus. The candidate may sit in a chair so his right foot may be brought to rest on one pedal at a time, in the same manner as it would come to rest on either the accelerator or the brake pedal of a car. His left foot may rest in position 99 to hold the unit against sliding movement. When the test is to start, switch 78 is closed, lighting the green light. The candidate has already been instructed to apply his left foot to pedal 62 on the showing of the green light. The supervisor then pushes one of the switches 78, 80 and 82 on block 72. When he presses switch 82, and causes the red light of member 54 to be lighted, the circuit of timing means 42 is closed, and the holding circuit is energized. It is now up to the candidate to depress pedal 64 as quickly as possible, by shifting his foot from pedal 62. When he does shift his foot and depresses pedal 64, he stops the rotation of hand 46.

In compartment 106 is located means whereby the perception of the driver as to distance may be tested. It has been considered that successive candidates might be able to transmit to each other, information regarding the testing apparatus and its preliminary setting, so that such succeeding candidates might "guess" at the probable result. One of the most dangerous factors in driving is the inability of the driver to gauge distance on the road. The relative distance between two cars on the road is of great importance, especially at the high speed at which motor vehicles are today driven. At the same time, the apparatus herein to test for that purpose is constructed to prevent a candidate using someone's previous observation to gauge his own errors, and thereby make adjustments which would enable him to overcome the purpose of the test.

In compartment 106 a pair of guides 108, which may take the form of Z members, are positioned in opposition to each other, to provide a passage 110 for a block 112. From block 112 a spindle 114 extends vertically upwardly through a slot 116 formed between the opposed ends of the Z members. A cord 118 has its ends secured on the two side faces of block 112, and extends from the block, down through passage 110, out through an opening 120 in wall 16, and then returns through another opening 122 into compartment 106. Within compartment 106, the cord is guided through a tube 124 held in place by a pair of brackets 126. From tube 124, cord 118 extends the length of the compartment to enter another curved tube 128, adjacent end wall 14 and likewise held in place by suitable brackets 126. The end tube 128 opens at passage 110, so that the cord may extend up to and be attached to block 112. By pulling on cord 118 outside of the cabinet, spindle 114 may be adjusted lengthwise of guides 108.

To one side of guides 108, within compartment 106, is located a spindle 130, intended to be relatively stationary with relation to the cabinet during a test; the spindle, however, is assembled in such manner that the supervisor may displace it to one of a number of preliminary settings before a test commences. For this purpose, a block 132 is disposed on partition 36. Block 132 may be made of any suitable material; it may have a pair of knobs 134 adjacent its end for manipulating the block. On the top face of the block is disposed a graduated plate 136, having graduations 138 on the side of plate 136 toward spindle 114. These graduations may be in any desired system of mensuration. Spindle 114 may carry a pointer 140, as, for instance, a brad or nail, extending therefrom to just reach the edge of plate 136 and graduations 138 thereon. Thereby, the supervisor will be enabled to read, directly in inches or other units, the relation of the position of spindle 130 on block 132 to the adjusted position of spindle 114, after the candidate completes his adjustment. Spindle 130 may be positioned at any position, preferably medially, of the length of block 132, the "zero" position. Spindle 130 may be of substantially the same length and thickness as spindle 114.

In the top face of partition 36, there are a plurality of aligned openings 142. These openings are in groups; in each group, the openings are equally spaced apart. The distance, as can be seen from Fig. 6, is such that dowels 144, provided in and extending downwardly from the bottom of block 132, provide a pair of pins to seat in a pair or group of such openings. As shown in Fig. 6, block 132 may be adjusted into three different possible positions; it is possible to reduce or increase the number of possible adjusted positions for the block.

As the candidate effects adjustment of block 112 by manipulating cord 118, it is intended that he adjust spindle 114 to what he believes to be the position of the relatively stationary spindle 130 lengthwise of the compartment, at which it was set by the supervisor at the beginning of the test. The supervisor may then read, on plate 136, the error of the adjustment, and thereby determine whether or not the candidate has the facility to determine position at a distance. Cord 118 may be made of a sufficient length so that the candidate would have to stand away from the apparatus at a good distance during his manipulation.

In order to provide illumination for spindles 114 and 130, illuminating means 146 are positioned in the corners 148 of compartment 106. These illuminating means are located on top of partition 36, closely adjacent end wall 16. Suitable reflectors 150, associated with these illuminating means, direct maximum amount of light outwardly, away from the spindles. Sufficient diffused light rays will pass upwardly and laterally from the illuminating means so that the spindles will be visible through opening 30 to the candidate. Closing of switch 76 closes the circuit for illuminating means 146.

On the inner faces of doors 24 and 26 are disposed means for retaining cards 152 or similar devices containing indicia or other media for use in testing vision of the applicants in the usual manner. For instance, on wall 24, a bent frame 154 may be secured in place. This frame includes a U-shaped member 156, providing a grooved receptacle for cards 152. These cards may each have different indicia 158 thereon. On door 26, a frame 160 may be provided for receiving and retaining other cards 152 of a different size and with other distinctive indicia thereon. Doors 24 and 26 may be opened outwardly, as shown in Figs. 1 and 2, and a visual test given to the candidate. Illumination for the cards on the two doors will be obtained from means 146, as directed by reflectors 150.

Device 162 may consist of a platelike member 164 having two end arcuate sections 166 and 168, and an intermediate section 170. Member 164 is mounted on and secured to a member 172 by suitable means. Member 172 may include a base member or block 174 having angularly extending arms 176 which include arcuate extensions 178. Openings 180 extend through both members 164 and 172. Top 18 has openings 182 with which openings 180 are to be aligned; bolts 184 and wing nuts 186 then serve to clamp device 162 against top 18.

Arcuate extensions 178 serve as stops for arms 188. Each arm 188 is provided a pivot on a bearing member 190 which may be anchored to member 164; a spring or elastic member 192, provided for each arm 188, is anchored to a wing 176 and to the arm itself. Each arm has a cord 194 attached thereto; the cord extends through a passage between member 174 and auxiliary blocks 196, held to member 164 in any suitable manner. These cords extend over the top of the cabinet when the apparatus is properly assembled, and are intended to be grasped by the supervisor.

Each arm 188 has an upwardly turned end 198 which, as the arm is moved by pulling on its cord 194, moves in an arcuate path past the edge 200 of plate member 164. The edge of the plate may be graduated in degrees, as shown, so that the supervisor will be able to determine, by inspection at the end of a test, the capabilities of the candidate as measured in the range of vision thus determined.

On handle 20 there may be a fixed spot 202 which, defined in any desired manner, is permanent and visible. It may be a rivet or like means. It is arranged to be in the line of sight of the eye 204 of the candidate who takes a position with his nose up against notch 206 in member 164. When the candidate is in this position, he is directed by the operator to look directly at spot 202. At that time, the turned up ends 198 are permitted to be retracted to their end positions by their springs. The supervisor then may pull on both cords 194 simultaneously, or on one cord at a time. The candidate, with his vision concentrated on spot 202, tells the supervisor when he sees ends 198. In this manner, the supervisor is able to determine the field of lateral vision on the part of the candidate. Manipulation of the cord, or failure to manipulate the cord, can be utilized by the supervisor to determine whether or not the candidate is answering correctly. For instance, a repetition of the test, resulting in two different positions for ends 198, may be used to determine whether the candidate is answering correctly.

In the top edge of wall 208 of frame 154, a pair of notches 210 may be provided. Then, in the space 212 between wall 208 and wall 24, device 162 may be inserted. Bolts 184 then may serve to seat in notches 210 as mounting means for the device when the device is collapsed and housed in the cabinet. A pair of dowels 214 may be provided on partition 36, about which is wound cord 118, after as much of it as possible is drawn into the cabinet for collapsing the apparatus.

In Fig. 12, there is illustrated an arrangement wherein device 162 is made separate and distinct from the cabinet. In such case, member 172, with its associated member 164, is mounted directly upon a platform provided with a grip or handle 216. An upright 218 having a small ball 220 then is used for the point upon which the eyes are to concentrate.

When it is desired to place the apparatus in condition for transportation, it is only necessary to position unit 58 in compartment 40. Device 162 is dismounted and placed so that bolts 184 are seated in notches 210. Cord 118 is drawn into the cabinet and wrapped around dowels 214, a small portion remaining stretched between openings 120 and 122 on wall 16. The extension cable for connecting the apparatus to a power source is disconnected, and is housed in compartment 40. Doors 24, 26, and 32 are closed, and the apparatus is ready for transportation.

Many other changes could be effected in the particular construction, and in the methods of use and construction, and in specific details thereof, hereinbefore set forth, without substantially departing from the invention defined in the claims, the specific description being merely of embodiments capable of illustrating certain principles of the invention.

What is claimed as new and useful is:

1. A device for testing persons such as drivers of automobiles, the device including a cabinet including a pair of side walls, a pair of end walls, and a top wall, one of the end walls having a sight opening therein, means within the cabinet and visible through the opening for determining the ability of the person being tested to determine relative locations of objects, the relative-location-testing means including test target members mounted in the cabinet for adjustment relatively to each other, means extending from the cabinet for manipulation by the tested person to effect such relative adjustment as such person observes the members through the opening, light sources in the cabinet, means in the cabinet for directing light from the sources to illuminate the relative-location-testing means and make them visible to the test person through said opening, the side walls being supported to swing outwardly from the cabinet to present their faces to be observed by the tested party in his position for manipulation of the relative-adjustment means, and means for receiving vision testing means, the receiving means being disposed on the faces of the side walls presented to be observed by the tested party when the side walls have been swung outwardly from the cabinet, the light-directing means functioning to direct light from the sources to the said faces.

2. A device for testing persons such as drivers of automobiles, the device including a cabinet including a pair of side walls, a pair of end walls, and a top wall, one of the end walls having a sight opening therein, means within the cabinet and visible through the opening for determining the ability of the person being tested to determine the relative locations of objects, the relative-location-testing means including test target members mounted in the cabinet for adjustment relatively to each other, means extending from the cabinet for manipulation by the tested person to effect such relative adjustment as such person observes the members through the opening, light sources in the cabinet, means in the cabinet for directing light from the sources to illuminate the relative-location-testing means and make them visible to the test person through said opening, the side walls being supported to swing outwardly from the cabinet to present their faces to be observed by the tested party in his position for manipulation of the relative-adjustment means, means for receiving vision testing means, the receiving means being disposed on the faces of the side walls presented to be observed by the tested party when the side walls have been swung outwardly from the cabinet, the light-directing means functioning to direct light from the sources to said faces, a handle for the cabinet disposed on the top wall, a range-of-vision device, means for demountably mounting the range-of-vision device on the top wall in a predetermined relationship to the handle, means on the handle for sighting by a tested person cooperating with the range-of-vision device to fix his vision, means for adjustment with relation to the sighting means, and means extending from the range-of-vision device and past the handle for effecting adjustment of the adjustment means for testing the tested person as to his range of vision.

References Cited in the file of this patent

UNITED STATES PATENTS

| Number | Name | Date |
|---|---|---|
| Re. 17,987 | Ferree et al. | Mar. 3, 1931 |
| 1,115,408 | De Zeng | Oct. 27, 1914 |
| 1,389,092 | Beach | Aug. 30, 1921 |
| 1,545,652 | Hagerty | July 14, 1925 |
| 1,813,777 | Stack | July 7, 1931 |
| 1,843,237 | McGiffert et al. | Feb. 2, 1932 |
| 1,937,445 | Smith | Nov. 28, 1933 |
| 1,953,954 | Constable | Apr. 10, 1934 |
| 1,960,111 | Kirk | May 22, 1934 |
| 2,177,501 | Smalley | Oct. 24, 1939 |
| 2,224,564 | De Silva | Dec. 10, 1940 |
| 2,273,091 | De Silva | Feb. 17, 1942 |
| 2,340,760 | Leland | Feb. 1, 1944 |
| 2,360,856 | Ames | Feb. 8, 1944 |
| 2,362,588 | Shepard | Nov. 14, 1944 |
| 2,478,662 | Long | Aug. 9, 1949 |

OTHER REFERENCES

War Department, Technical Manual No. 8–300, pages 104–107, incl. Notes on Eye, Ear, Nose and Throat in Aviation Medicine, publ. Government Printing Office, 1940.